May 6, 1924.

J. J. LA DUCER 1,492,640

TWO-SPINDLE MILLING MACHINE

Filed April 30, 1920   2 Sheets-Sheet 1

Inventor
J. J. La Ducer.
By S. Jay Tella
Attorney

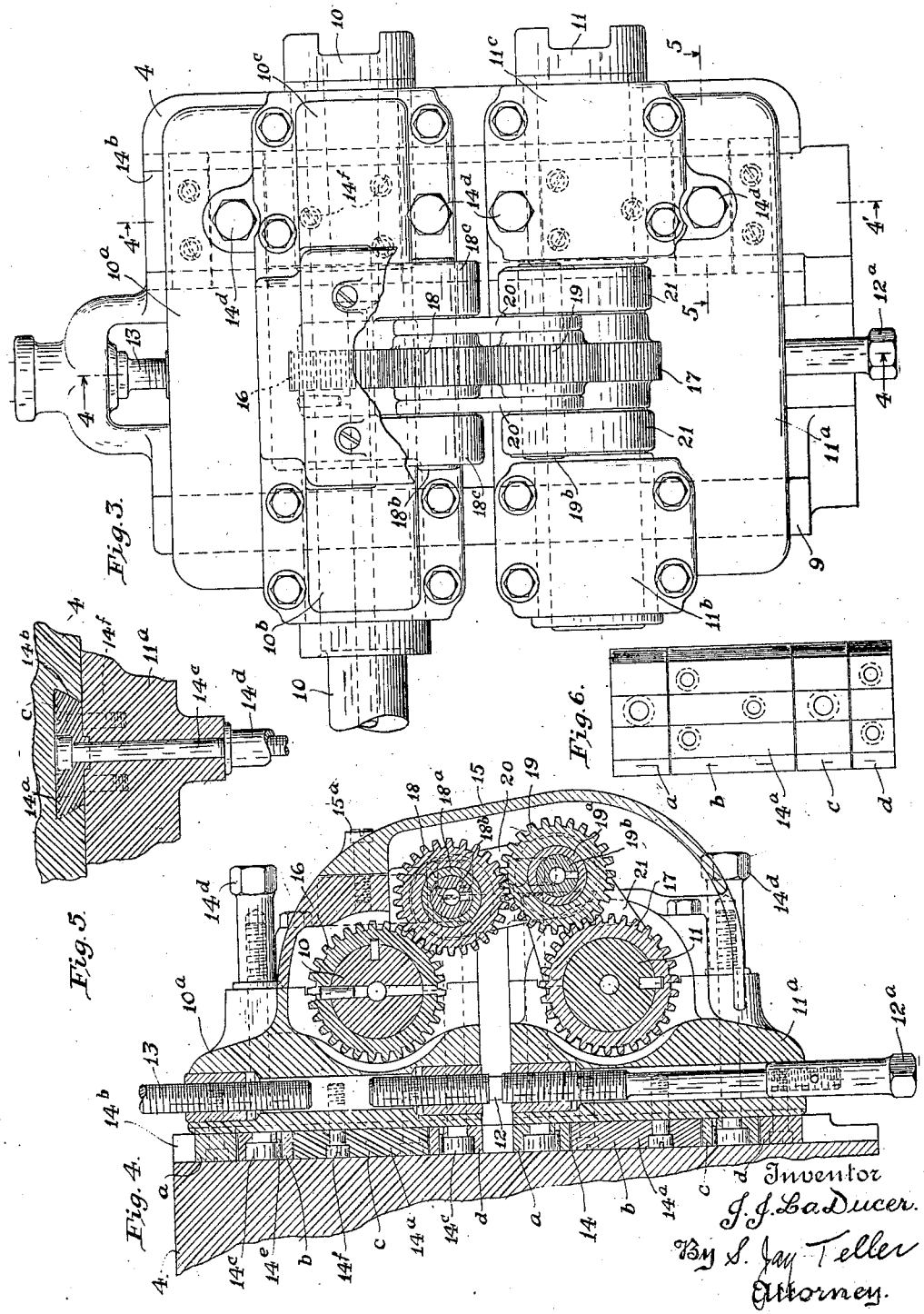

Patented May 6, 1924.

1,492,640

UNITED STATES PATENT OFFICE.

JERRY J. LA DUCER, OF HARTFORD, CONNECTICUT, ASSIGNOR TO PRATT & WHITNEY COMPANY, OF NEW YORK, N. Y., A CORPORATION OF NEW JERSEY.

TWO-SPINDLE MILLING MACHINE.

Application filed April 30, 1920. Serial No. 377,873.

*To all whom it may concern:*

Be it known that I, JERRY J. LA DUCER, a citizen of the United States, residing at Hartford, in the county of Hartford and State of Connecticut, have invented certain new and useful Improvements in Two-Spindle Milling Machines, of which the following is a specification.

This invention relates to cutter spindle mechanism adapted for use in cutting machinery, particularly milling machines. The particular object of the invention is to provide a plural spindle mechanism wherein the spindles may be conveniently adjusted to different working positions and rotated in all positions of adjustment.

It is an object of the invention to provide a milling machine with a headstock and a tailstock thereon and to mount a pair of parallel cutter-spindle heads on the headstock and a pair of parallel spindle-end supporting heads on the tailstock in such manner that either pair of heads may be adjusted transversely as a unit or relatively to each other.

It is a further object of the invention to mount two cutter spindles in a parallel position and connect such spindles by means permitting relative adjustment thereof; to provide a driving connection between such spindles which will be operative in all positions of adjustment of the spindles; and to further provide means for adjusting the spindles as a unit or relatively to each other.

Another object of the invention is to mount two relatively adjustable and operably connected spindles in separate heads or housings and to provide a cover guard over a portion of the heads in such manner that the connecting and operating mechanism between the spindles will be housed thereby in all positions of adjustment of the spindles.

Further objects of the invention will become apparent as the description proceeds.

Referring to the drawings:

Fig. 3 is a front elevation of the spindle mechanism on an enlarged scale, a portion of the housing being broken away to disclose the connections between the spindles.

Fig. 4 is a transverse section thereof taken partially on the line 4—4 of Fig. 3 to illustrate the gearing and connections between the cutter spindles and heads and partially on the line 4'—4' of Fig. 3 to illustrate the head clamping mechanism.

Fig. 5 is a transverse section through the head on the line 5—5 of Fig. 3 showing the head clamping mechanism.

Fig. 6 is an elevation showing the head clamping plates.

Figure 1:
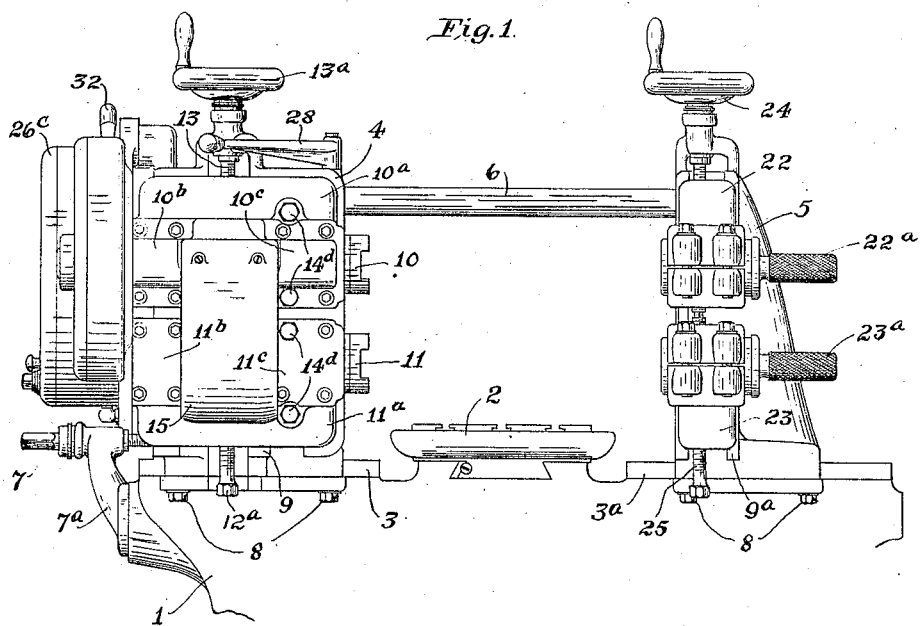
Figure 1 is a front elevation of the top portion of a milling machine embodying the present invention.

Referring more specifically to the drawings by reference characters, 1 designates the base or bed of a milling machine having a reciprocating work table 2 mounted therein. The construction of the table and its operating mechanism is preferably of the type illustrated and described in Patent No. 1,231,255, to B. M. W. Hanson, wherein the table is adapted to be reciprocated at any one of several speeds. This specific construction, however, comprises within itself no part of the present invention and therefore will not be further described herein.

Adjustably mounted on the ways 3 and $3^a$ of the base 1 are a headstock 4 and a tailstock 5 respectively and in order to secure rigidity and strength to the cutting tools, I preferably detachably connect these parts by a bar 6 clamped to each stock. The headstock is adjustable on its ways by means of a screw 7 journaled in a bracket $7^a$ on the base and both stocks may be adjusted together by said screw when connected by the bar 6. These stocks are each secured in working position by means of bolts 8 and are provided with vertical guideways 9 and $9^a$ on which are mounted the spindle-supporting heads and spindle-end supporting heads respectively. In certain classes of work the headstock alone is used, the tools being supported solely in the headstock spindles. When performing such work, the bar 6 and the tailstock may be removed if desired.

As heretofore stated, I herein provide a plurality of cutter spindles, two being illustrated in the drawings, mounted for lateral or transverse adjustment either together as a unit or relatively to each other. These spindles 10 and 11 are illustrated as being mounted in heads $10^a$ and $11^a$ which are adjustable on the vertical guideway 9, the upper spindle being mounted in bearings $10^b$ and $10^c$ and the lower spindle being mounted in bearings 11$^b$ and 11$^c$. The heads are normally held in a relatively fixed position as by means of the double screw 12 and a second screw 13 journaled in the headstock and threaded into the upper head may be operated by a hand wheel 13$^a$ to raise or lower the two heads as a unit. Rotation of the screw 12 by means of the squared end 12$^a$ pinned to the screw serves through the right and left hand threads thereof to relatively adjust the two heads. Means for clamping each head is illustrated at 14 and comprises sectional clamping elements or plates 14$^a$ (Fig. 6) adapted to travel vertically in a dovetail way 14$^b$ in the headstock 4 and to be tightened into clamping position by means of clamping bolts 14$^c$ and nuts 14$^d$ thereon. Each of these clamping plates comprises four sections $a$, $b$, $c$ and $d$. Sections $b$ and $d$ are bolted to the head by screws 14$^f$ and sections $a$ and $c$ are held in the head by the clamping bolts 14$^c$. These clamping plates are freely slidable in the dovetailed way 14$^b$ when not clamped by the bolts 14$^c$. The bolts 14$^c$ are held from rotation by means of pins 14$^e$. I preferably provide a housing or cover guard 15 bolted as at 15$^a$ to the upper head. This guard extends downwardly to the lowest adjustable position of the head 11$^a$ and thereby encloses the operative connections between the spindles in all positions thereof.

I preferably provide inter-connecting means for the spindles whereby both spindles are driven together in all positions of adjustment. This construction comprises gears 16 and 17 on the spindles and intermediate connecting gears 18 and 19 which are preferably supported as follows. The gear 18 is mounted on a bushing 18$^a$ on a non-rotary shaft 18$^b$ secured in bearings 18$^c$, 18$^c$ on the head 10$^a$, such shaft being in fixed relation to the spindle 10 and the gear 18 being always in mesh with the gear 16. The gear 19 is rotatably mounted on a bushing 19$^a$ on a shaft 19$^b$ having bearing in the ends of two pairs of links 20 and 21 respectively. The inner links 20 secure the shaft 19$^b$ to the shaft 18$^b$ and the outer links 21 secure the shaft 19$^b$ to the spindle 11, the links being mounted on and rotatable about the shaft 18$^b$ and spindle 11 respectively. It will be seen that by this construction the gear 19 is movable in a path concentric to the shaft 18$^b$ and spindle 11 whereby the gear 19 is held in mesh with gears 17 and 18 in all positions of adjustment of the spindle 11.

The spindle-end supporting heads 22 and 23 are preferably mounted and adjustable on the tailstock in the same manner as the heads 10$^a$ and 11$^a$ are mounted on the headstock. The hand wheel and screw 24 serves to adjust both heads as a unit and the screw 25 is adapted to adjust the heads relatively to each other. Handles 22$^a$ and 23$^a$ are secured to the respective bearings for the spindle ends in the heads 22 and 23 and serve as a convenient means for adjusting and removing such bearings.

Figure 2:
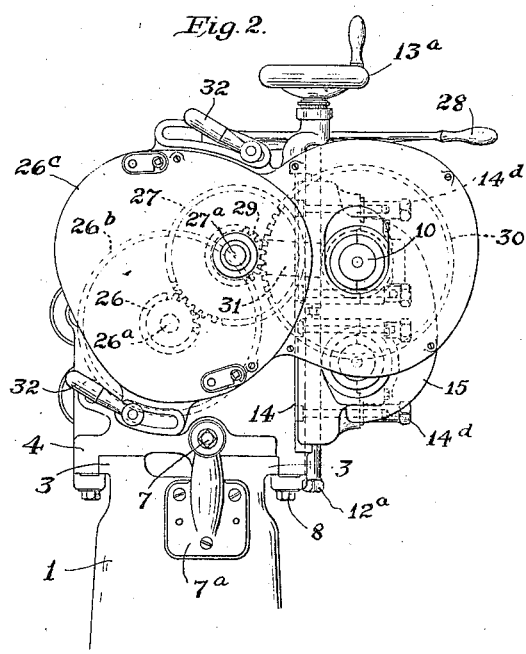
Fig. 2 is an end view thereof showing the spindle driving mechanism.

The driving or rotating means for the spindle is illustrated generally in Figs. 1 and 2. A gear 26 on the shaft 26$^a$ preferably driven from the belt wheel 26$^b$ within the housing 26$^c$ meshes with a larger gear 27 mounted on a shaft 27$^a$ secured in bearings in the housing 26$^c$. A hand lever 28 is adapted to shift the driving belt to control the operation of the machine. A smaller gear 29 secured to the shaft 27$^a$ meshes with a large gear 30 on the outer end of the cutter spindle 10, and a link connection 31 between the spindle 10 and the shaft 27$^a$ serves to hold these gears in a meshing relation in all positions of adjustment of the spindle 10. In adjusting the spindle 10, the housing 26$^c$ is adapted to be adjusted about the shaft 26$^a$ and secured in such adjusted position by means of clamps 32.

It is believed that the construction and operation of the machine illustrated herein will be clearly understood from the above description and that therefore further description is unnecessary.

What I claim is:

1. In a milling machine, the combination of a base, a headstock thereon, two parallel cutter spindles mounted on the headstock, means for transversely adjusting the spindles together as a unit or relatively to each other, means for rotating one of the spindles, and other means operatively connecting the first spindle with the second spindle whereby both are rotated together in all positions of adjustment.

2. In a milling machine, the combination of a base, a headstock thereon, two parallel cutter spindles mounted on the headstock, means for transversely adjusting the spindles together as a unit or relatively to each other, means for rotating one of the spindles, and means comprising connecting links and drive gearing operatively connecting the spindles whereby both are rotated together in all positions of adjustment.

3. In a milling machine, the combination of a base, a headstock thereon, a cutter head slidably mounted on the headstock, a cutter spindle mounted in the head, a second head slidably mounted on the headstock, a second cutter spindle mounted in the second head, means connecting the two heads for relative adjustment, a cover guard extending from one of the heads over the other head in all positions of adjustment, and means for rotating the spindles.

4. In a milling machine, the combination of a base, a headstock thereon, two parallel cutter spindles mounted on the headstock, means for transversely adjusting the spindles together as a unit or relatively to each other, means for rotating one of the spindles, means comprising connecting links and drive gearing operatively connecting the spindles whereby both are rotated together in all positions of adjustment, and a cover guard extending over the spindles and the connections therebetween in all positions of adjustment.

5. In a milling machine, the combination of a base, a headstock and a tailstock thereon, a pair of parallel cutter-spindle heads mounted on the headstock, a pair of parallel spindle-end supporting heads mounted on the tailstock, either pair of heads being adapted to be laterally adjusted as a unit on its support, and means for relatively adjusting the heads of each pair laterally.

6. In a milling machine, the combination of a base, a headstock and a tailstock thereon, a work table between the said stocks, the stocks being adjustable toward and from the table, means for securing the stocks in adjusted position, a pair of parallel cutter-spindle heads mounted on the headstock, a pair of parallel spindle-end supporting heads mounted on the tailstock, either pair of heads being adapted to be laterally adjusted as a unit on its support, and means for relatively adjusting the heads of each pair laterally.

7. In a milling machine, the combination of a base, a headstock and a tailstock thereon, a work table between the said stocks, a pair of parallel cutter-spindle heads mounted on the headstock, a pair of parallel spindle-end supporting heads mounted on the tailstock, means for laterally adjusting each pair of heads as a unit on its respective stock, and means for relatively adjusting the heads of each pair laterally.

8. In a milling machine, the combination of a base, a headstock and a tailstock thereon, a work table between the said stocks, a pair of parallel cutter-spindle heads mounted on the headstock, a pair of parallel spindle-end supporting heads mounted on the tailstock, screw means for adjusting each pair of heads laterally as a unit on its respective stock, and screw means for relatively adjusting the heads of each pair laterally.

In testimony whereof, I hereto affix my signature.

JERRY J. LA DUCER.